United States Patent
Liao et al.

(10) Patent No.: US 6,292,833 B1
(45) Date of Patent: Sep. 18, 2001

(54) METHOD AND APPARATUS FOR PROVIDING ACCESS CONTROL TO LOCAL SERVICES OF MOBILE DEVICES

(75) Inventors: Hanqing Liao, San Ramon; Peter F. King, Half Moon Bay; Bruce K. Martin, Jr., Palo Alto, all of CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/118,640

(22) Filed: Jul. 17, 1998

(51) Int. Cl.[7] .......................... G06F 15/16; G06F 15/173
(52) U.S. Cl. ........................ 709/229; 709/219; 709/225
(58) Field of Search ........................... 709/219, 225, 709/229

(56) References Cited

U.S. PATENT DOCUMENTS

| | | | |
|---|---|---|---|
| 5,371,794 | * 12/1994 | Diffie et al. | 380/21 |
| 5,602,916 | * 2/1997 | Grube et al. | 380/21 |
| 5,678,041 | * 10/1997 | Baker et al. | 707/9 |
| 5,696,898 | * 12/1997 | Baker et al. | 713/201 |
| 5,706,507 | * 1/1998 | Schloss | 707/104 |
| 5,708,780 | * 1/1998 | Levergood et al. | 709/229 |
| 5,889,942 | * 3/1999 | Orenshteyn | 713/201 |
| 5,889,958 | * 3/1999 | Willens | 709/229 |
| 6,014,696 | * 1/2000 | Araki et al. | 709/219 |
| 6,021,433 | * 2/2000 | Payne et al. | 709/219 |

FOREIGN PATENT DOCUMENTS

| | | |
|---|---|---|
| 0 562 890 | 9/1993 | (EP) . |
| WO 90 13213 | 11/1990 | (WO) . |
| WO 97 19395 | 5/1997 | (WO) . |

OTHER PUBLICATIONS

"HDML 2.0 Language Reference Version 2.0", Jul. 1997, Unwired Planet Software Developer Kit.

* cited by examiner

*Primary Examiner*—Krisna Lim
(74) *Attorney, Agent, or Firm*—Beyer Weaver & Thomas, LLP

(57) ABSTRACT

Techniques for ensuring secure access to local service of mobile devices of a wireless communication system are disclosed. The techniques control access to local services of mobile devices such that only authorized services are able to remotely alter the local services of the mobile devices. Before permitting access to local services of a mobile device, the identity of the network site seeking to have access is checked to determine whether the network site is authorized for such access. If the network site is authorized, then access is permitted and the network site is able to modify or alter the local services of the mobile device. On the other hand, when the network site is not authorized, then the network site is denied access to the local service so that the local services provided by the network site are not open to attack or corruption from unscrupulous network sites.

36 Claims, 10 Drawing Sheets

METHOD AND APPARATUS FOR PROVIDING ACCESS CONTROL TO LOCAL SERVICES OF MOBILE DEVICES

BACKGROUND OF THE INVENTION

1. Field of the Invention

The present invention relates to mobile devices and, more particularly, to secure access to local services of mobile devices.

2. Description of the Related Art

A wireless network is often used to transmit messages from one location in a network to a destination location in the network. These messages contain data to be supplied to the destination location. In some cases the messages are responses to requests for information from a source location. In other cases the messages are notification messages that are sent to the destination location without any specific request. The wireless network typically includes various mobile devices. Also, the network that the wireless network is coupled to often includes many remote servers that store various kinds of information.

Mobile devices are provisioned (i.e., configured) to operate in specific ways. The provisioning can be preset in the mobile phone, can be performed by a user, or can be performed when the mobile device connects to the wireless network. Often, the mobile devices will be provisioned over the air after the mobile device connects to the wireless network. The provisioning of a mobile device determines how various basic functions of the mobile device will operate. Typically, a mobile device has a set of local services that provides the basic functions of the mobile device. Examples of such basic functions include setting or updating wireless voice and data protocol parameters, address books, and various other parameters that can be used to enable or disable certain telephony and data features of the mobile devices.

The provisioning of a mobile device over the air means that local service parameters are acquired or set within the mobile device to control its operation by accessing provisioning information from the network. For example, a mobile device can request provisioning information from a particular remote server on the network, the mobile device can then be provisioned in accordance with the provisioning information acquired from the particular remote server. The particular remote server is ordinarily a service provider for a particular service to be enjoyed by the mobile device. As such, the service provider contains the necessary provisioning information to provision a mobile device over the air.

Often, the provisioning information acquired from the particular remote server is executable or binary code. The executable or binary code contains interfaces, data or operations that cause the mobile device to modify local service parameters so that some of the functions of the mobile device are set or altered. Examples of the executable or binary code include scripts, JAVA applets and compressed Mark-up Language data files.

Conventionally, because a mobile device can be provisioned from remote servers over a network, there are problems concerning unauthorized provisioning of a mobile device. In an open wireless network environment, it is plausible for any remote sites or service provider to access the local services provided by a mobile device. For example, a remote site or service provider can provision a mobile device to change the local service parameters supported by the mobile device. As a result, the local services of the mobile devices are open to malicious attack from hackers and the like which can cause the mobile device inoperative or operable in undesirable states. As an example, a virus code could be undesirably downloaded as provisioning information from an unscrupulous remote server to a mobile device and consequently would erase or damage local service parameters currently stored in the mobile device so that the mobile device no longer operates properly.

Thus, there is a need for ensuring secure access to local service parameters of mobile devices.

SUMMARY OF THE INVENTION

Broadly speaking, the invention relates to techniques for restricting access to local services of mobile devices. The local services may include functions of modifying wireless voice/date protocols, configuration or system parameters, bookmarks, addresses, subscriber provisioning information and other parameters that may enable or disable certain telephony and data features of the mobile devices. The mobile devices include, but are not limited to, mobile computing devices, cellular phones, palm-sized computer devices, and Personal Digital Assistants (PDAs). The mobile devices are capable of communicating wirelessly with one or more service providers or remote servers on a network. The invention provides secure access to the local services of mobile devices such that only authorized services (e.g., from authorized servers or network sites) are able to remotely invoke or update the local services of the mobile devices. According to the invention, before permitting access to local services of a mobile device, the identity of a remote service seeking to have the access is checked to determine whether the remote service is authorized for such access. If the remote service is authorized, then the access is permitted and the remote service is able to execute or update the local services of the mobile device. Conversely, when the remote service is not authorized, then the access is denied so that the local services provided by the mobile device are not open to attack or corruption from unauthorized remote services from unscrupulous servers or network sites.

The invention can be implemented in numerous ways including a method, a computer readable medium, an apparatus, and a system. Several embodiments of the invention are discussed below.

As a method for ensuring secure access to local services of a mobile device, one embodiment of the invention includes the acts of: receiving a message from a computer through a network, the message having a service identity associated therewith; determining whether the message seeks access to the local services of the mobile device; comparing the service identity associated with the message against one or more authorized service identities at least when the determining act determines that the message seeks access to the local services of the mobile device; and permitting the message to access the local services of the mobile device only when the comparing act indicates that the service identity associated with the message matches at least one of the one or more authorized service identities.

As a computer readable medium having computer program code for ensuring secure access to local services of a mobile device, one embodiment of the invention includes: computer program code for receiving executable code from a computer through a network, the executable code having a service identity associated therewith; computer program code for executing the executable code; and computer program code for preventing the executable code from accessing the local services of the mobile device during execution unless the service identity associated with the executable code matches at least one of a plurality of authorized service identities.

As a mobile device capable of connecting to a network of computers through a wireless link, one embodiment of the invention includes: a display screen that displays graphics and text; a message buffer that temporarily stores a message from a computer on the network of computers, the message having a service identity associated therewith; an application that utilizes the message received from the computer on the network of computers; a local services data area that stores local services data which controls the operation of the mobile device; an authorization storage area that stores authorized service identities that are permitted to access the local services data area; and an access controller that controls access to the local services data area such that the local services data cannot be altered by the application utilizing the message, unless the service identity associated with the message matches at least one of the authorized service identities.

As a wireless communication system, one embodiment of the invention includes a wired network having a plurality of server computers, a wireless carrier network operatively connected to the wired network, and a plurality of wireless mobile devices supporting certain local services. The certain local services provided on the wireless mobile devices are used in determining system parameters. Messages are supplied to the wireless mobile devices from the server computers of the wired network via the wireless carrier network. Each of the wireless mobile devices operates, upon receiving one of the messages, to prevent the one of the messages from accessing the system parameters of each of the wireless mobile devices unless a service identity associated with the one of the messages matches at least one of a plurality of authorized service identities.

The advantages of the invention are numerous. One advantage of the invention is that local services of mobile devices can be provisioned over the air in a secure fashion. Another advantage of the invention is that access to the local service parameters of a mobile device is able to be protected from hackers or unscrupulous network sites.

Other aspects and advantages of the invention will become apparent from the following detailed description, taken in conjunction with the accompanying drawings illustrating, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to techniques for ensuring secure access to local services of a mobile device of a wireless data network. The invention provides techniques to control the access to local services (e.g., local service parameters) of a mobile device such that only authorized services (e.g., authorized network sites) are able to remotely alter the local services of the mobile device. The invention thus prevents unauthorized services (e.g., hackers or unauthorized network sites) from altering the local services of a mobile device.

Embodiments of the invention are discussed below with reference to FIGS. 1–7B. However, those skilled in the art will readily appreciate that the detailed description given herein with respect to these figures is for explanatory purposes as the invention extends beyond these limited embodiments.

Figure 1:
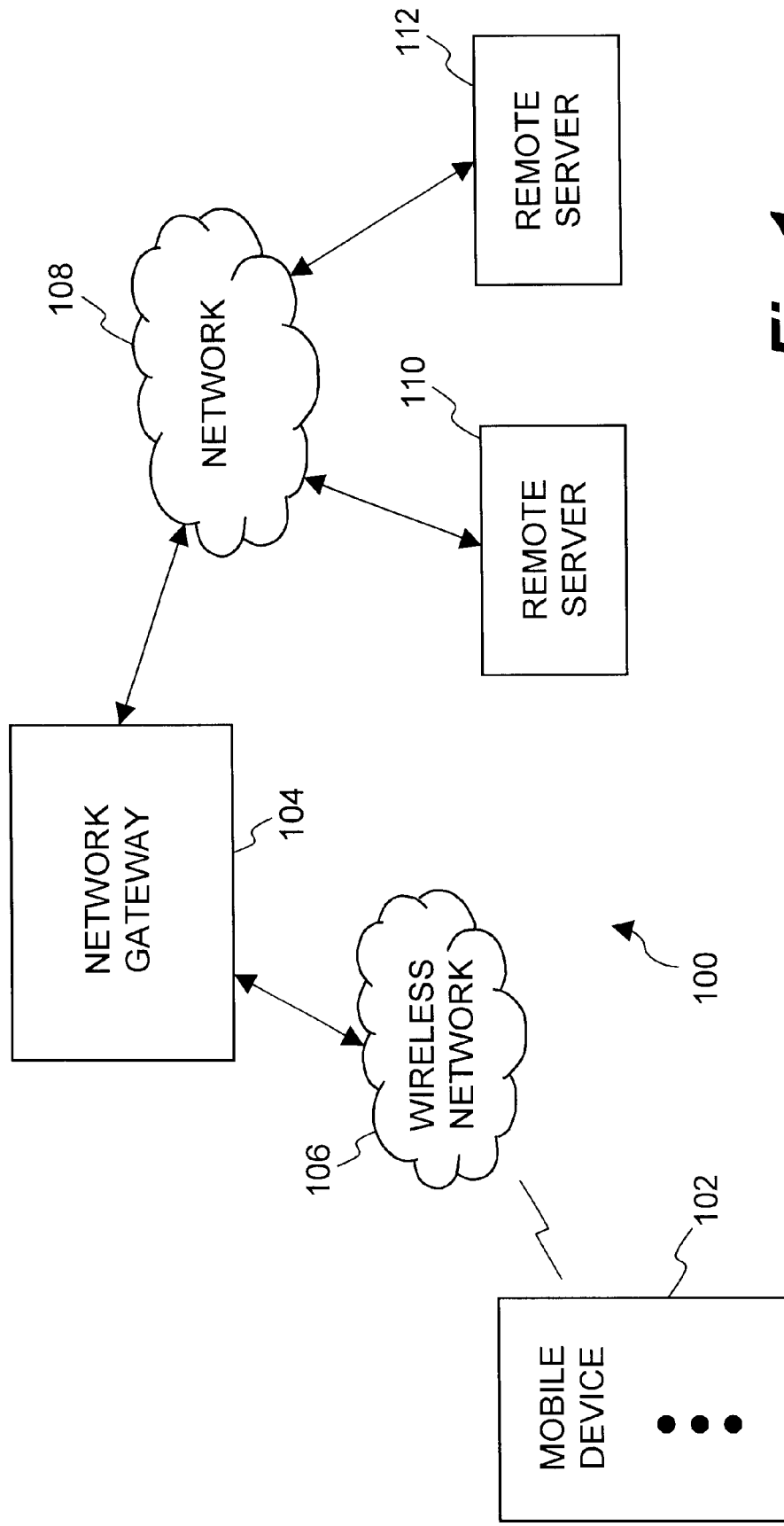
FIG. 1 is a block diagram of a wireless communication network according to an embodiment of the invention.

FIG. 1 is a block diagram of a wireless communication network 100 according to an embodiment of the invention. The wireless communication network 100 includes a mobile device 102 that communicates with a network gateway (or proxy server) 104 via a wireless network 106. The network gateway 104 is also coupled to a network 108. The network 108 can be a private network or a public network, either wired or wireless. An example of a large public network is the Internet. The network 108 includes or is coupled to a plurality of remote servers including a remote server 110 and a remote server 112.

The network gateway 104 is typically a computer system that operates to send and receive information to and from the mobile device 102 and the network 108. Although only a single mobile device 102 is illustrated in FIG. 1, it should be recognized that the wireless communication network 100 can accommodate a large number of mobile devices. The wireless network 106 typically uses radio transmissions to communicate with the mobile device 102. The wireless network 106 can use a variety of different networks and communication protocols. Examples of wireless networks include Cellular Digital Packet Data (CDPD), Global System for Mobile Communications (GSM), Code Division Multiple Access (CDMA) and Time Division Multiple Access (TDMA) to name a few, and each of these wireless networks has different data transfer characteristics such as latency, bandwidth, protocols and connection methods. As examples, protocols can be Internet Protocol (IP), Short Messaging System (SMS) and Unstructured Supplementary Service Data (USSD), and connection methods can include packet switched or circuit switched.

The remote servers 110 and 112 are typically computers coupled to the network 108. Typically, the servers provide resources that are accessible via the network 108. One type of service that these remote servers 110 and 112 can provide is provisioning information for the mobile devices 102. In other words, the mobile device 102 could access the remote server 110 or the remote server 112 to retrieve provisioning information that would enable the mobile device 102 to be provisioned over the air. For example, where the mobile device 102 was previously provisioned to operate in CDMA and is now provisioned by an authorized service in the remote server 112 to operate in GSM when the remote server 112 detects that the mobile device 102 is in a location in which CDMA is no longer available. Typically, the provisioning of the mobile device 102 by the authorized service via a particular remote server would provide services on the mobile device 102 that correspond to those offered by the remote server or its owner or affiliate. The provisioning information that is used to provision the mobile device 102 is typically obtained as a message sent from the remote server 112 or 110 or requested by the mobile device 102. Preferably, the provisioning information is in a format that is most efficiently transportable in the wireless network 106. There may be a number of different formats, such as ASCII data, binary data, executable or object code, each suitable for a particular wireless network. According to one embodiment, the format is executable code. Upon receiving the provisioning information in executable code, the mobile device 102 executes the executable code that subsequently causes the mobile device to be provisioned accordingly. In one embodiment, the executable code comprises one or more compressed Handheld Device Markup Language decks or HDML decks. Each deck comprises a number of cards, each of the cards corresponding to a screen display of the mobile device. Optionally, a user of the mobile device 102 may be provided with a list of choices in a screen display so that a desired local service is executed or updated. The specification of HDML, entitled "HDML 2.0 Language Reference" is enclosed and incorporated herein by reference in its entirety.

As an example, one local service for the mobile device could be a phone book. To utilize the phone book, the mobile device would access the remote server to obtain provisioning information for use of the phone book or to update the information in the phone book after the user executes a command. Typically, the provisioning information would be executable code that would be downloaded and executed and subsequently uses the local services on the mobile device to setup the mobile device for use of the phone book. The provisioning information could also include the phone book or a link thereto.

As noted above, conventional wireless communication networks do not provide protection for local service of its mobile devices. In other words, unauthorized access can be made to the local services of a mobile device. As a result, by provisioning the mobile device, unscrupulous persons can render the mobile device inoperable or useless. For example, a hacker could implant a virus into the mobile device through the remote invocation of local services.

According to the invention, a mobile device will only permit certain remote services to access the local services of the device to cause the device to modify or update system parameters so that the device will act accordingly. In this way, the local services are secured from unauthorized tampering which may lead to inoperability or irrecoverable loss of valuable information of the mobile device. The operation of the invention to provide this protection to the local service information is discussed in more detail below.

Figure 2:
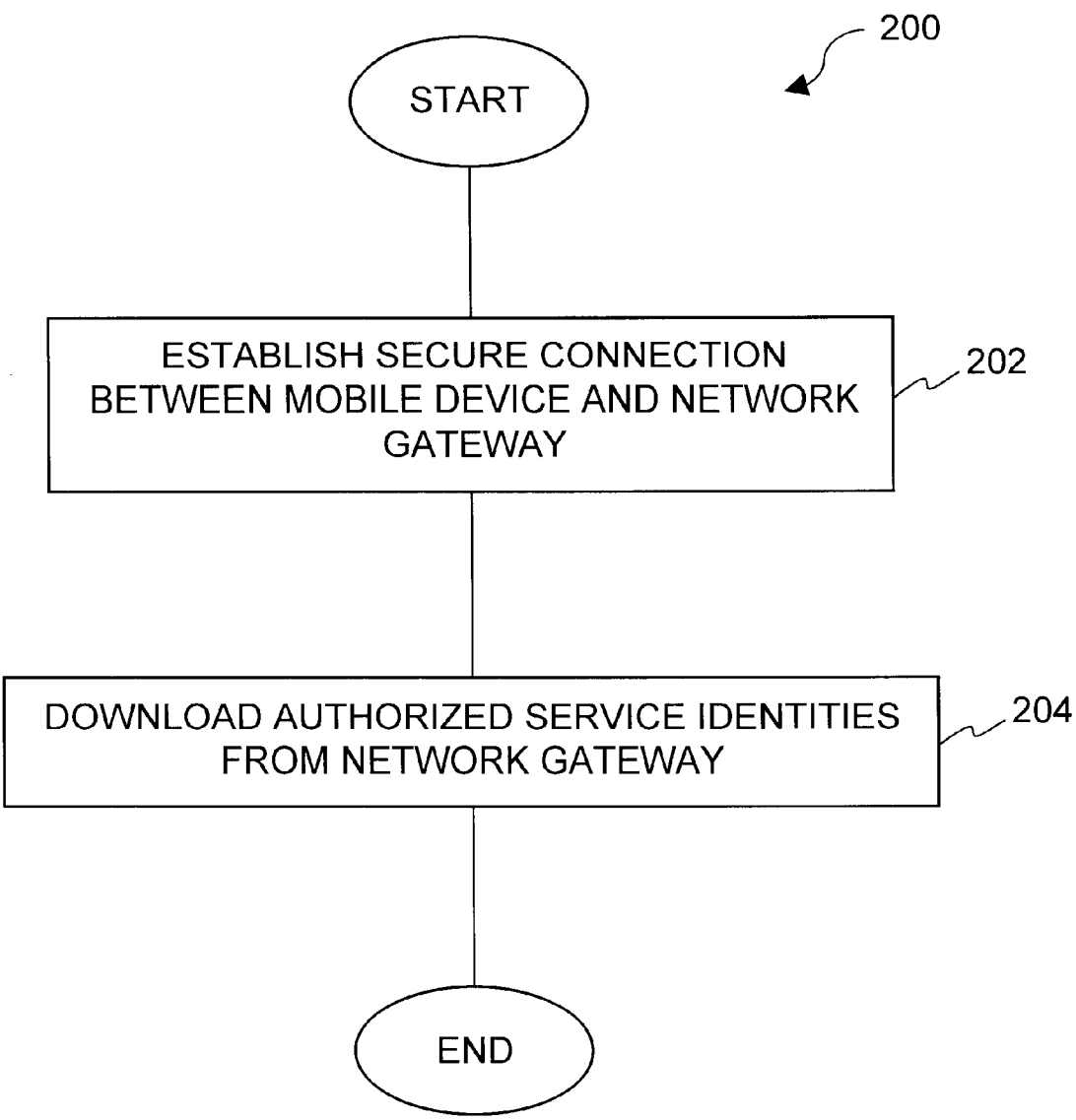
FIG. 2 is a flow diagram of mobile device initialization processing according to an embodiment of the invention.

FIG. 2 is a flow diagram of mobile device initialization processing 200 according to an embodiment of the invention. The mobile device initialization processing 200 is performed by a mobile device, such as the mobile device 102 illustrated in FIG. 1.

The mobile device initialization processing 200 initially establishes 202 a secure connection between the mobile device 102 and the network gateway 104. The establishment of secure connections (or sessions) between a mobile device and a network gateway are performed to enable the mobile device to communicate securely with remote servers on a network (e.g., the remote servers 110 and 112 on the network 108). Typically, the connection is either secure because it is a private network or made secure through encryption. Then, once a secure connection is established, provisioning information and other secure data including authorized service identities can be downloaded 204 from the network gateway 104 to the mobile device 102. The secure connection prevents the information being subsequently transferred between the network gateway 104 and the mobile device 102 from being intercepted or altered. Additional detailed description of establishing the secure connection or communication session is provided in commonly assigned U.S. patent application Ser. No. 08/966,988 entitled "Method and System for Secure Lightweight Transactions in Wireless Data Networks" by Hanqing Liao et al, which is hereby incorporated by reference in its entirety. Following block 204, the mobile device initialization processing 200 is complete and ends.

Figure 3A:
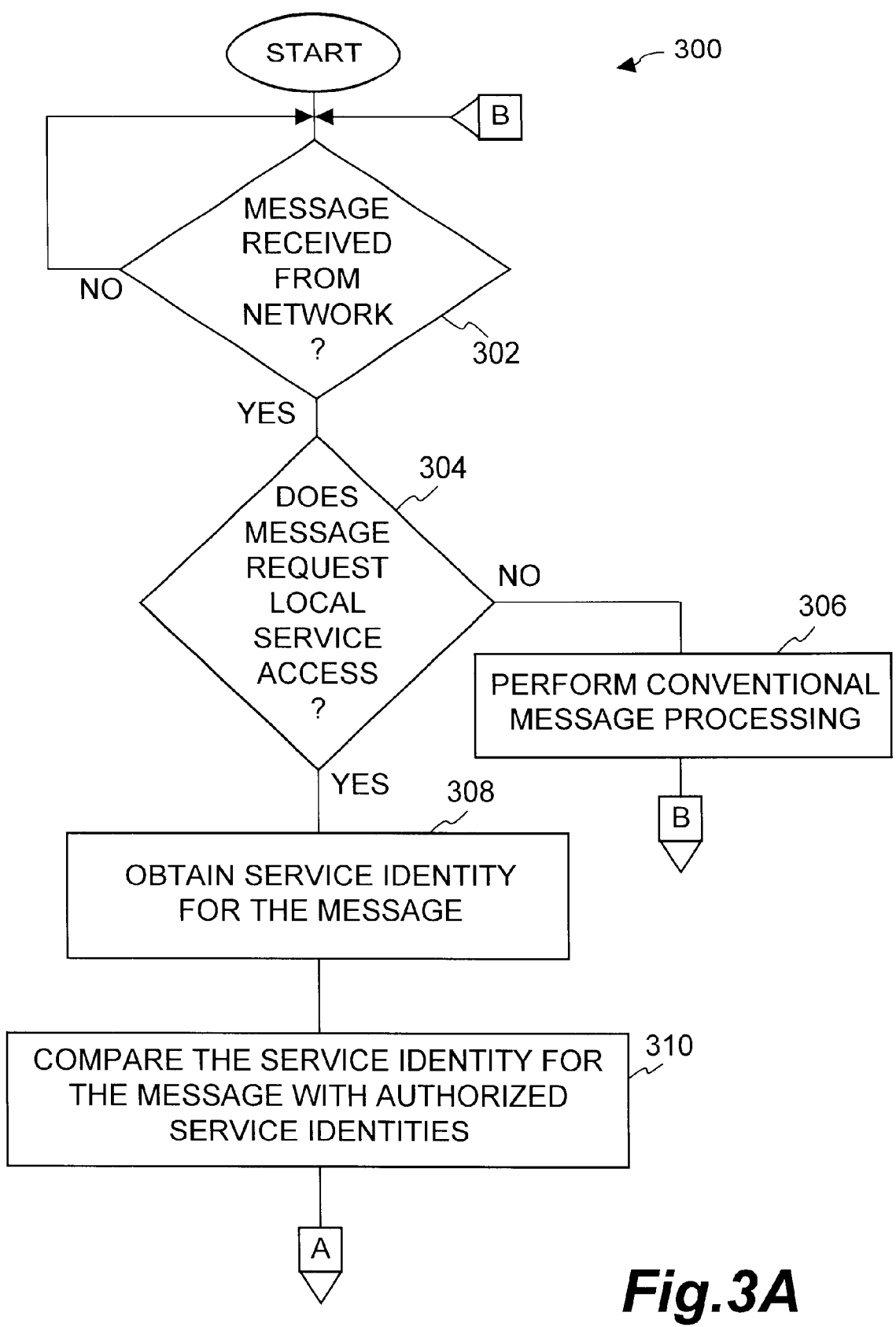
FIGS. 3A and 3B are flow diagrams of mobile device message processing according to an embodiment of the invention.
Figure 3B:
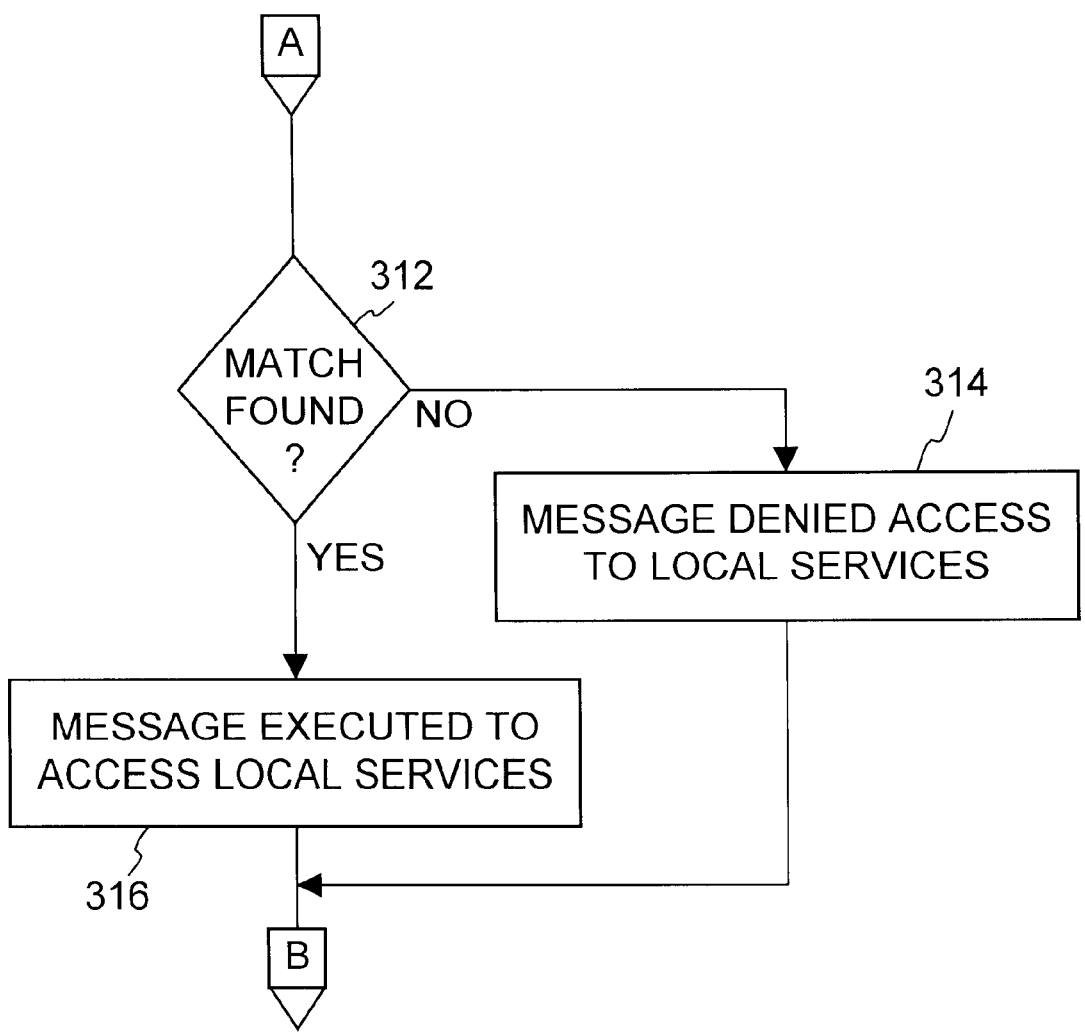

FIGS. 3A and 3B are flow diagrams of mobile device message processing 300 according to an embodiment of the invention. The mobile device message processing 300 is, for example, performed by the mobile device 102 illustrated in FIG. 1. While a message is generally any block of data provided to the mobile device from a network, in the case of over the air provisioning of a mobile device, the message typically contains executable code that is to be executed on the mobile device. The execution of the executable code by the mobile device may invoke the local services of the device that actually performs the provisioning for the mobile device. The format of the executable code can vary widely, including scripts, JAVA, HDML decks, ASCII data, library functions and etc.

The mobile device message processing 300 initially begins with a decision block 302 that determines whether a message has been received from the network. For example, the message from the network could be provided to the mobile device via a network gateway. As long as the decision block 302 determines that a message has not yet been received from the network, the mobile device message processing 300 awaits the reception of such a message. However, once a message has been received from a network, the mobile device message processing 300 continues.

Once the mobile device message processing 300 continues, a decision block 304 determines whether the message requests local service access. Here, the decision block 304 determines whether or not the message that has been received from the network is requesting access to the local services of the mobile device. Access to the local services means that the local services provided by the mobile device are invoked, which could modify (e.g., add, remove, alter) the system parameters/data stored in the mobile device so that the mobile device acts accordingly. This determination by the decision block 304 can be implemented in a variety of ways. One way to implement the determination is to scan the message to determine whether it contains a flag or other identifier that signifies access to the local services of the mobile device. Another way is to begin execution of the message (i.e., executable code) and then monitor its execution for any requests to access to the local services.

In any case, when the decision block 304 determines that the message is not requesting access to the local services, then conventional message processing is performed 306. Conventional message processing is well known by those skilled in the art and thus not further discussed herein. Following block 306, the mobile device message processing 300 returns to repeat the decision block 302 and subsequent blocks to process subsequent messages received from the network.

On the other hand, when the decision block 304 determines that the message does request access to the local services of the mobile device, then a service identity for the message is obtained 308. Normally, the service identity will serve to identify the origin of the message. The service identity for the message can take a variety of forms. As examples, the service identity can take the form of a domain name, a full or partial Universal Resource Locator (URL), an Internet Protocol (IP) address, a phone number, a text string, or a combination of the above. Nevertheless, the service identity may be part of the message, or can be inferred by the mobile device based on the information/ knowledge the mobile device has for the message. For instance, a message may itself contain no service identify of any form, but the mobile device can infer the service identity from the fact that the message is linked with another message which explicitly contains a service identity.

Once the service identity is obtained 308, the service identity for the message is compared 310 with authorized service identities. In one embodiment, the authorized service identities are locally stored within the mobile device. In such an embodiment, the authorized service identities are securely downloaded from the network (e.g., the network gateway 104) during initialization (see FIG. 2). However, in other embodiments, some or all of the authorized service identities can be provided remotely with respect to the mobile device or entered interactively by a user through a keypad and a display screen.

Next, a decision block 312 determines whether a match has been found based upon the comparison in block 310 of the service identity for the message with the authorized service identities. When the decision block 312 determines that a match has not been found, the message is denied access to the local services of the mobile device. Here, the message is denied access because it was not able to be validated by the authorized service identities. By denying access to the local service in such a case, the local services of the mobile device are protected from unauthorized access. On the other hand, when the decision block 312 determines that a match has been found, then the message (i.e., executable code) is executed 316 and thus able to access the local services of the mobile device. The execution 316 of the message is thus permitted to access the local services of the mobile phone to update, add, delete or otherwise alter the system parameters/data in the mobile device through the local services. Following blocks 314 and 316, the mobile device message processing 300 returns to repeat the decision block 302 and subsequent blocks to process subsequent messages received from the network.

Figure 4A:
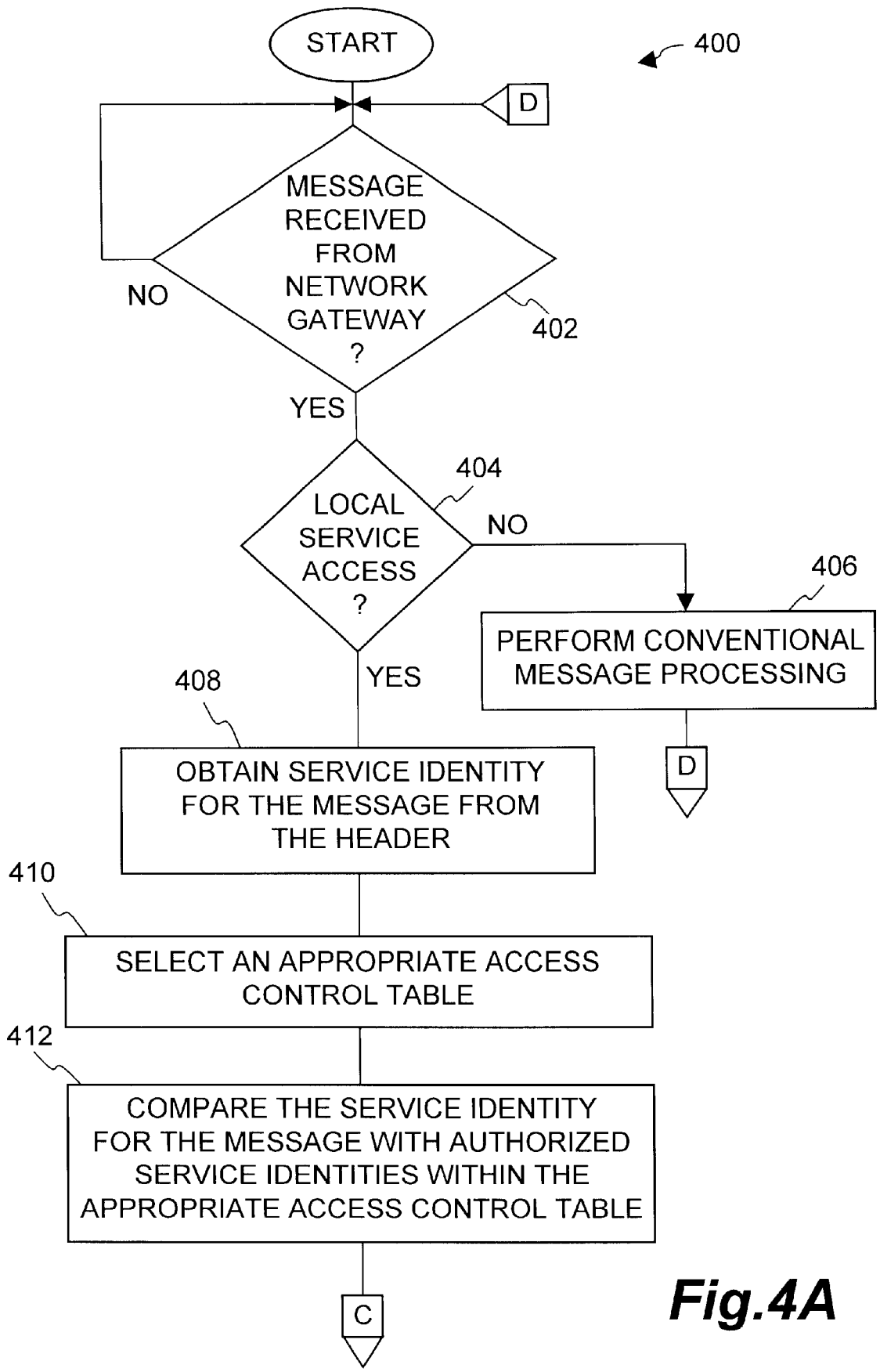
FIGS. 4A and 4B are flow diagrams of mobile device message processing according to another embodiment of the invention.
Figure 4B:
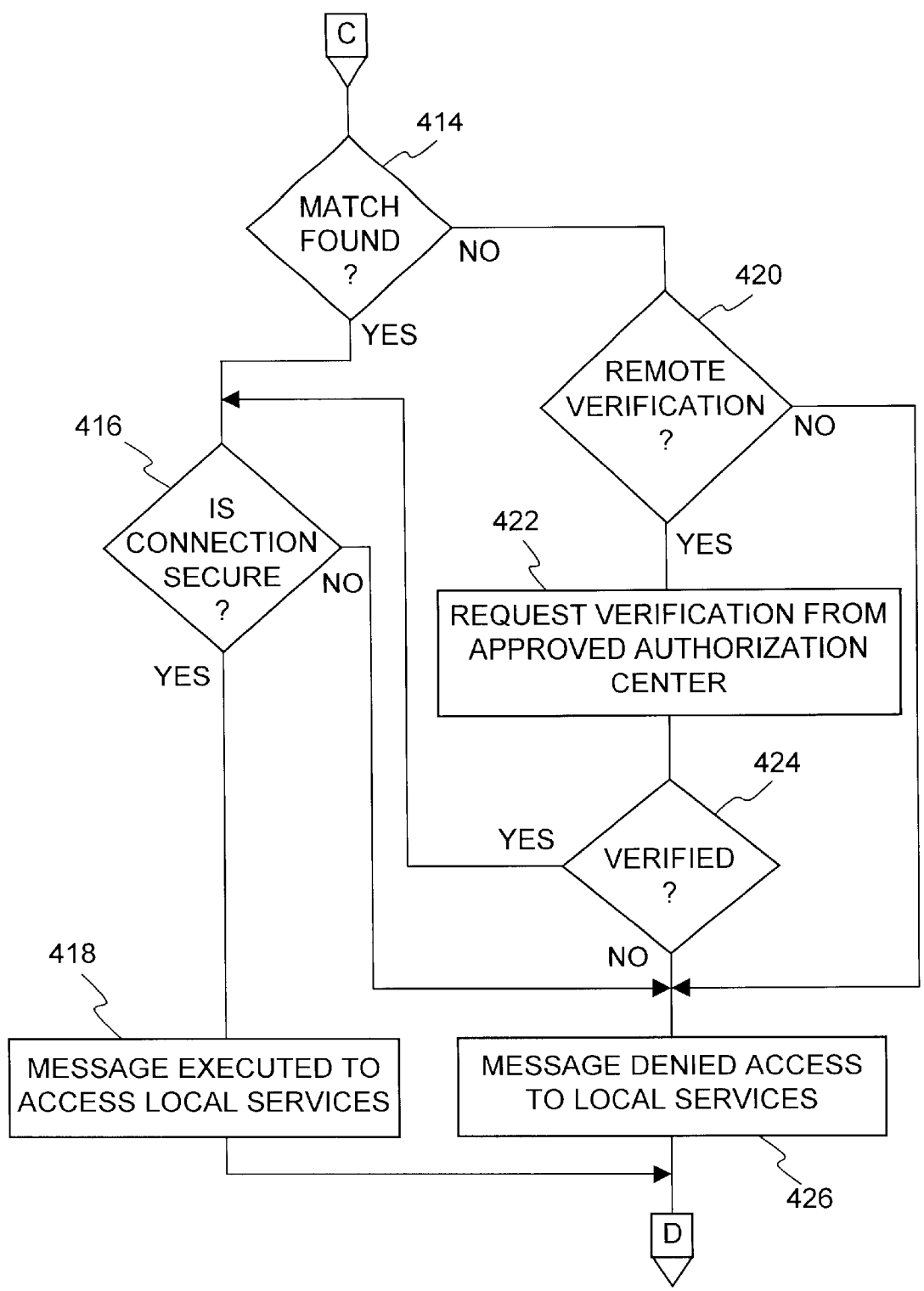

FIGS. 4A and 4B are flow diagrams of mobile device message processing 400 according to another embodiment of the invention. The mobile device message processing 400 is, for example, performed by the mobile device 102 illustrated in FIG. 1. Again, a message is generally any block of data provided to the mobile device from a network and has a format that includes a header portion comprising destination information and a body portion comprising data information. In the case of over the air provisioning of a mobile device, the message typically contains executable code that is to be executed on the mobile device. The execution of the executable code by the mobile device may invoke the local services of the device to perform provisioning for the mobile device. In this embodiment, the mobile device couples to the network via a network gateway.

The mobile device message processing 400 initially begins with a decision block 402 that determines whether a message has been received from the network gateway. The message originates from a remote server (i.e., network site) on the network and is provided to the mobile device via the network gateway. As long as the decision block 402 determines that a message has not yet been received from the network gateway, the mobile device message processing 400 awaits the reception of such a message. However, once a message has been received from a network, the mobile device message processing 400 continues.

Once the mobile device message processing 400 continues, a decision block 404 determines whether the message requests local service access. Here, the decision block 404 determines whether or not the message that has been received from the network gateway is requesting access to the local services of the mobile device. Access to the local services means that the local services provided by the mobile device are invoked, which could modify (e.g., add, remove, alter) the system parameters/data stored in the mobile device so that the mobile device acts accordingly. This determination by the decision block 404 can be implemented in a variety of ways. One way to implement the determination is to scan the message to determine whether it contains a flag or other identifier that signifies access to the local services of the mobile device. For example, in the case of an HDML message, known as a deck, an identifier "device:" could identify access to the local services of the mobile device. Another way to implement the determination is to begin execution of the message (i.e., executable code) and then monitor its execution for any requests to access to the local services. The following example shows a compiled and linked version embedded in the message:

Service_request()

. . .

device:network_change(CDPD, GSM);
   device:reset_retransmission_time(initial_time, subsequent_time ▭);

. . .

The provisioning information in the example requests the mobile device currently provisioned to operate in CDPD network now be provisioned to operate in GSM network, and further that the mobile device also be provisioned to retransmit message at specified time intervals. In this example, the Network_change() and reset_retransmission_time() correspond to local services of the mobile device.

In any case, when the decision block 404 determines that the message is not requesting access to the local services, then conventional message processing is performed 406. Conventional message processing is well known by those skilled in the art and thus not further discussed herein. Following block 406, the mobile device message processing 400 returns to repeat the decision block 402 and subsequent blocks to process subsequent messages received from the network gateway.

On the other hand, when the decision block 404 determines that the message does request access to the local services of the mobile device, then a service identity for the message is obtained 408 from the header portion of the message. Here, either the message arrives at the network gateway from the remote server already having the service identity in the header portion of the message or the service identity is added to the header portion of the message before forwarding the message to the mobile device. In either case, the mobile device is able to obtain 408 the service identity for the message from the header portion of the message. Normally, the service identity will serve to identify the origin of the message. The service identity for the message can take a variety of forms. As examples, the service identity can take the form of a domain name, a full or partial URL, an IP address, a phone number or a combination of the above.

Once the service identity for the message is obtained 408, an appropriate access control table is selected 410. The advantage of offering multiple, different access control tables is that access control can be different for different local services, different mobile device, or different applications. For example, the access control table can be a global table, or the access control table can be appropriate for a particular application or local service, or some combination thereof. For example, in the case of HDML, an access control table can be provided for every local service HDML deck, and the access control tables can be implemented by ACCESSPATH and ACCESSDOMAIN attributes in HDML.

Once the appropriate access control table is selected, the service identity for the message is compared 412 with the authorized service identities within the appropriate access control table. In this embodiment, the access control tables are locally stored within the mobile device after being downloaded from the network gateway during initialization (see FIG. 2).

Next, a decision block 414 determines whether a match has been found based upon the comparison in block 412 of the service identity for the message with the authorized service identities within the appropriate access control table. When the decision block 414 determines that a match has been found, then a decision block 416 determines whether the connection between the mobile device and the remote server is secure. Typically, the network gateway knows that the connection between the mobile device and the network gateway (via the wireless network) is secure by examining the state of the connection. In addition, the network gateway can also determine if the connection between the network gateway and the remote service is secure. For example, the connection may or may not be established using a secure protocol such as Secure Sockets Layer (SSL) or secure HTTP (HTTPS) protocol. In general, these connections can be made secure using encryption or through use of private networks.

When the decision block 416 determines that the connection is secure, then the message (i.e., executable code) is executed 418 and thus able to access the local services of the mobile device. In this case, the service identity (e.g., origin) of the message was authorized and the connection was determined to be secure, thus the message is permitted to access the local services of the mobile device. The secure connection prevents unauthorized messages from passing themselves off as originating from an authorized service identity and prevents messages from being intercepted and altered during transport. Following block 418, the mobile device message processing 400 returns to repeat the decision block 402 and subsequent blocks to process subsequent messages received from the network gateway.

On the other hand, when the decision block 414 determines that a match has not been found, then a decision block 420 determines whether remote verification is desired. If remote verification is desired, then the mobile device message processing 400 requests 422 verification from an approved authorization center. Here, the approved authorization center is resident on the network. In one embodiment, the mobile device sends a request to the approved authorization center that requests authorization of the message, and then awaits a reply from the approved authorization center. Next, a decision block 424 determines whether the service identity for the message has been verified by the approved authorization center. If the service identity for the message is verified, then processing proceeds to the decision block 416 so that the message is subsequently processed as if the service identity of the message match an entry in the appropriate access control table. Alternatively, when the decision block 424 determines that the approved authorization center cannot verify the service identity of the message, then the message is denied access to the local services of the mobile device in block 426. Here, the message is denied access because it was not able to be validated by the authorized service identities in the appropriate access control table or the approved authorization center. By denying access to the local services in such a case, the local services of the mobile device are protected from unauthorized access. Following block 426, the mobile device message processing 400 returns to repeat the decision block 402 and subsequent blocks to process subsequent messages received from the network gateway.

Further, when the decision block 416 determines that the connection is not secure, then the message is denied access to the local services of the mobile device in block 426. Here, the message is denied access because the connection was determined not to be secure. By denying access to the local services in such a case, the local services of the mobile device are protected from unauthorized access.

Figure 5:
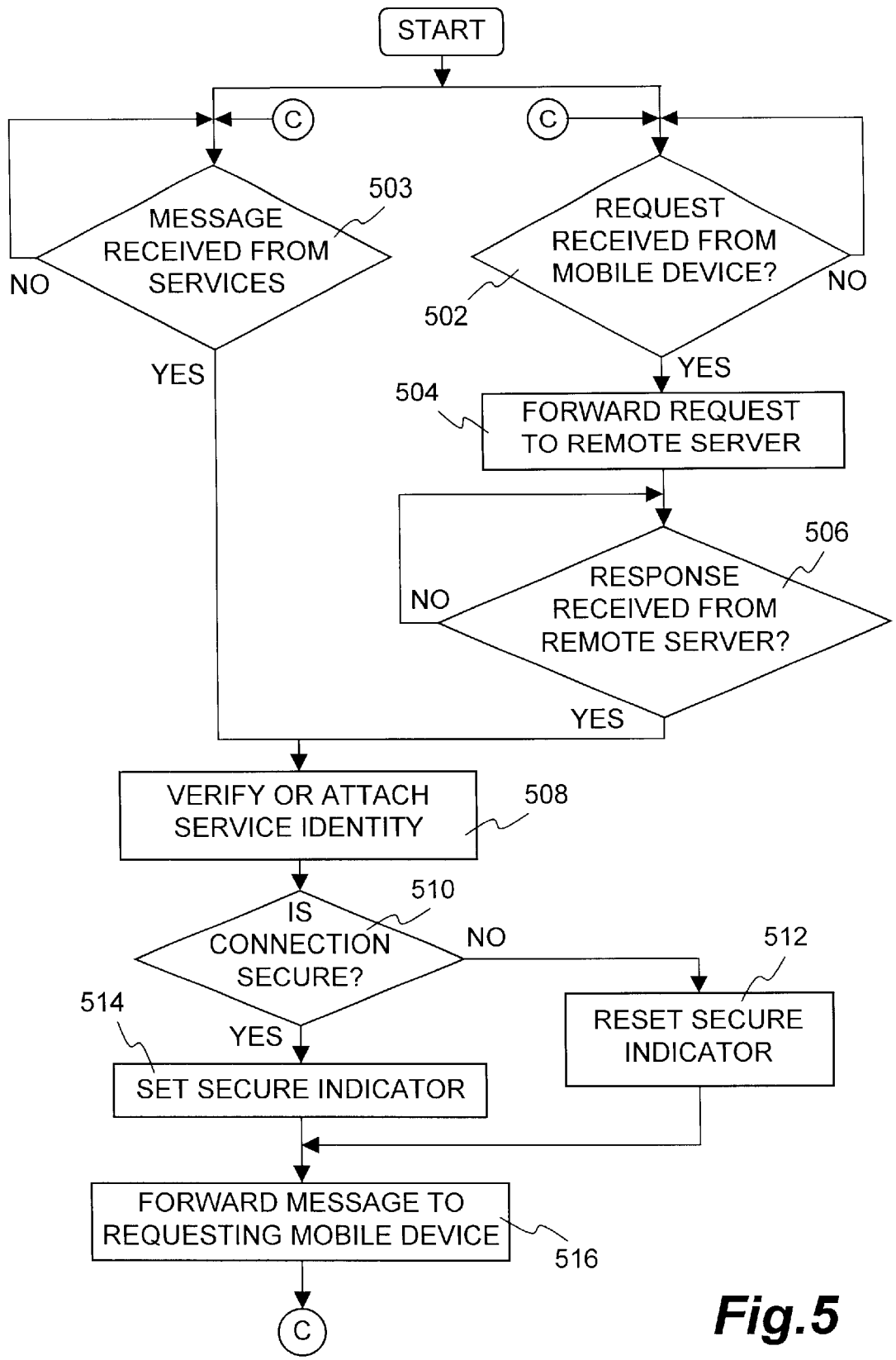
FIG. 5 is a flow diagram of network gateway processing according to an embodiment of the invention.

FIG. 5 is a flow diagram of network gateway process 500 processing requests from a mobile device to download provisioning information from a server according to an embodiment of the invention. The network gateway processing 500 is, for example, performed by the network gateway 104 illustrated in FIG. 1.

The network gateway processing 500 initially begins with a decision block 502. The decision block 502 determines whether a request has been received from a mobile device. The request can be embedded in a message sent to a remote server or standalone as a message to the remote server that couples to the network gateway via a network. The information request can, for example, be a block of data such as executable code. When the decision block 502 determines that a request has not yet been received from a mobile device, then the network gateway processing 500 awaits the reception of such a request. However, once the decision block 502 determines that a request has been received from a mobile device, then the network gateway processing 500 continues.

Once the network gateway processing 500 has a request to be processed, the request is forwarded 504 to the remote server. Next, a decision block 506 determines whether a response has been received from the remote server. Here, the network gateway processing 500 is awaiting the reception of a response from the remote server to the request that was forwarded 504 to the remote server. The response waited for is the information requested (e.g., block of data). When the response has not yet been received, the decision block 506 causes the network gateway processing 500 to await the response. However, a time-out condition is often utilized to prevent the network gateway processing 500 from having to await the reception of a response for an undue amount of time. Once the decision block 506 determines that the response has been received from the remote server, then a service identity of the remote server providing the response is verified or attached 508. If the response that has been received already includes a service identity, which may be part of the origin information of the service, the service identity is verified. Here, the verification can ensure that the service identity of the response is the same as the service identity of the remote server where the request was previously sent. Alternatively, when the response received does not include a service identity, the service identity of the remote server where the request was previously sent is attached. Additionally the gateway can verify the service identity of the remote service by third-party verification or the certificate based authentication.

Next, a decision block 510 determines whether the connection being utilized is secure. Here, the connection of concern can be a virtual connection from the mobile device to the remote server or some portion thereof. In any case, when the decision block determines that the connection is not secure, a secure indicator is reset 512. On the other hand, when the decision block 510 determines that the connection is secure, a secure indicator is set 514. Following either block 512 or 514, the response is forwarded 516 to the requesting mobile device. At this point, the network gateway processing 500 has completed the processing of issuing a request on behalf of the mobile device and forwarding the response from a remote server to the mobile device. The response being forwarded by the network gateway to the mobile device includes the service identity and the secure indicator. The mobile device can then process the message to restrict access to its local services to only authorized identities. Following block 516, the network gateway processing 500 returns to repeat the decision block 502 and subsequent blocks for each subsequent request received from a mobile device.

Alternatively, a message can instead be supplied to the network gateway by the remote server without the mobile device having made a request. In such a case, the decision block 503 simply receives the message from the remote server. Following block 503, the network gateway processing 500 continues with blocks 508–516 as previously discussed.

Returning to the mobile device initialization 200 described above with respect to FIG. 2, the initialization processing can also provide additional information to the mobile device. For instance, the network gateway can inform the mobile device of the type of service identity being utilized, the type of security indicator (e.g., HTTPS or a secure flag in the message header), selection criteria for different access control tables, suitable third-party verification entities and their addresses, and/or message format and the location of the service identity within the message. As previously noted, the type of service identity can include a domain name, full or partial URL, IP address, phone number, a text string, or combination of them. Further refinement in the type of service identity is also possible, for example, the URL service identities can by anywhere from the full URL (i.e., domain name plus path) to just the domain name of the URL.

Third-party verification entities for a mobile device can provide a fallback location for obtaining authorization for the service identity of a message. As noted above, the mobile device initialization can inform the mobile device of the verification entities and their addresses. Then, for example, as shown in FIGS. 4A and 4B, remote verification by one or more suitable third-party verification entities can be attempted. The verification is remote because it is performed external to the mobile device and typically on a remote server located on the network. Typically, the third-party verification entities are stored in the mobile device, such as in an access control table. If the remote verification is successful, then the message is deemed authorized. Additionally, after a successful remote authorization has occurred, the appropriate list of authorized service entities stored in the mobile device (e.g., access control table) can be updated to include the service identity of the message which is verified by the third party verification entity.

Moreover, although the communications system discussed above often included a network gateway (or proxy server), it should be recognized that the invention can operate without such a network gateway or proxy server by directly coupling the wireless network to the network of computers. In such a case, the mobile device may verify the service identity of the message prior to the comparison of the service identity. The verification can be done by the mobile device through such means as the certificate based authentication.

Figure 6:
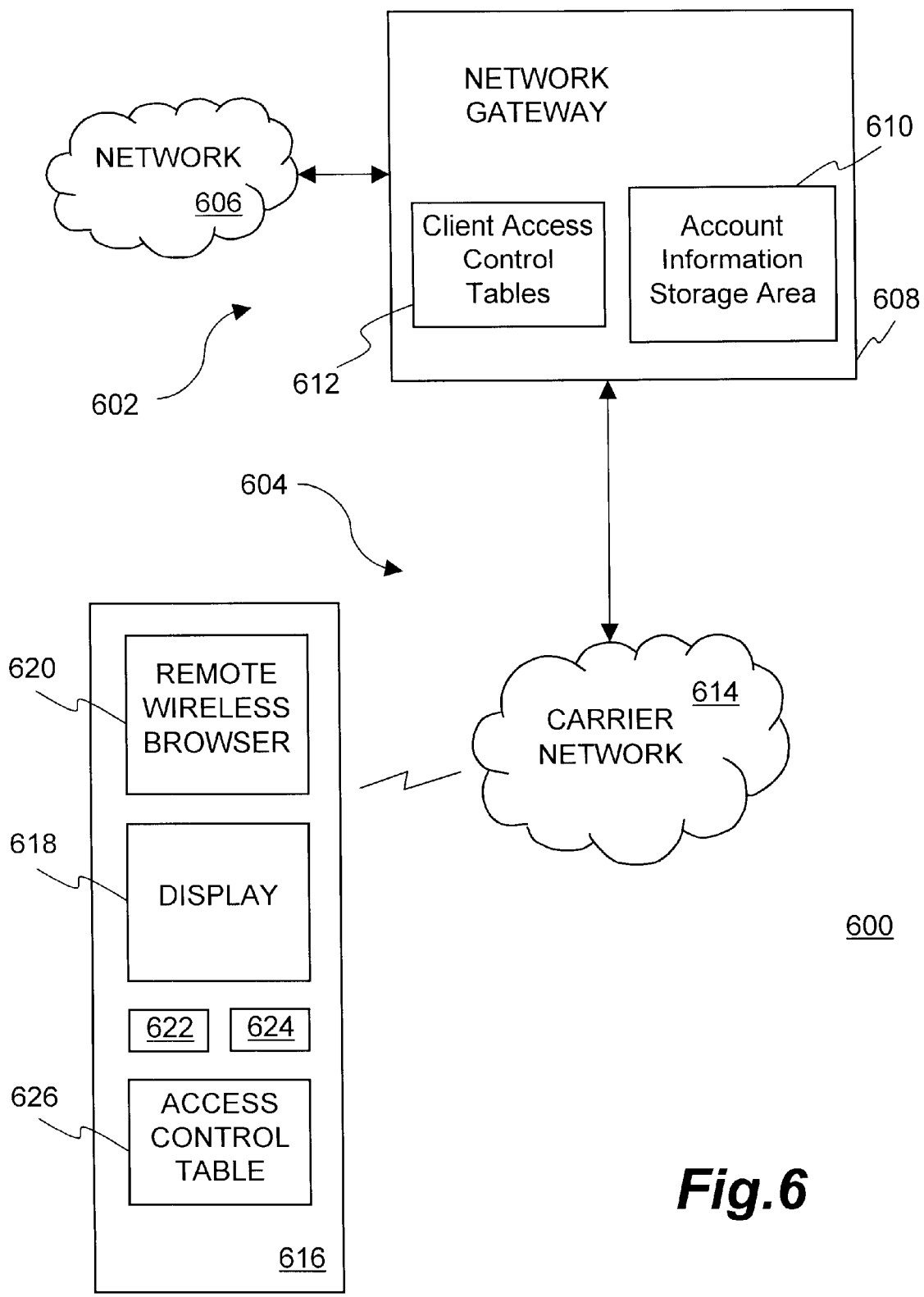
FIG. 6 is a block diagram of a representative communication system for use with the invention.

FIG. 6 is a block diagram of a representative communication system 600 for use with the invention. The communication system 600 includes a wired section 602 and a wireless section 604. The wired section 602 includes a network 606 and a network gateway 608. In one embodiment, the network 606 is the Internet, which represents a large number of interconnected computers. In another embodiment, the network 606 is an intranet or private network of computers.

The network gateway 608 operates to provide a gateway from the wired section 602 and the wireless section 604. The network gateway 608 serves as a primary transition point between the wireless communication of the wireless section 604 and the wired communication of the wired section 604. The network gateway 608 receives the incoming content request from the carrier network 614 and performs protocol conversion as necessary. The network gateway 608 will normally perform some protocol translation and other account management and verification operations. The network gateway 608 includes an account information storage area 610 that stores account, configuration and other information. The network gateway 608 also includes client access control tables 612 for the various one of the remote wireless computing devices of the communication system 600. The wireless section 604 includes a carrier network 614 and at least one remote wireless computing device 616. According to the invention, the network gateway 608 also receives messages from the network 606 and forwards them to the appropriate remote computing devices.

The remote computing device 616 can, for example, be a mobile phone, a Personal Digital Assistant (PDA), or a portable general purpose computer. The remote wireless computing device 616 includes a display 618 for displaying screens or pages of information, a remote wireless browser 620, and navigation buttons 622 and 624. The remote wireless browser 620 is usually an application program that executes on the remote computing device 616. The remote wireless browser 620 provides the screens or pages of information to be displayed on the display 618. The navigation buttons 622 and 624 allow a user to navigate through or make selections from menus or lists being displayed on the display 618 by the remote wireless browser 620. The remote wireless computing device 616 can also include an alphanumeric keypad (not shown) that allows a user to enter alphanumeric information with respect to the mobile telephone 616, though such is not necessary as alphanumeric information can also be entered using a dial screen displayed on the display 618 with selections being made using the navigation buttons 622 and 624. By interacting with the remote wireless browser 620, a user is able to access information located on the network 606. Additionally, the remote wireless computing device 616 includes an access control table 626. The access control table 626 stores authorized service identifiers that are permitted to access and therefore modify local services (e.g., various operational parameters) stored in the remote wireless computing device 616.

Typically, the wireless section 604 includes a plurality of remote wireless browsers 620, each of which executes on a different remote computing device. The configuration and other information stored in the account information storage area 610 can store service limitations, security limitations, preference information, screen configuration information, and the like for each of the remote wireless browsers 620. The account information storage area 610 can also store data or pages of data that are of interest to the remote wireless browsers 620. The stored data or pages can operate as a cache of information previously requested from the network 606 or can operate as an information server within the network gateway 608. For example, as an information server, the storage pages can represent pages to be displayed by the remote wireless browsers.

Figure 7A:
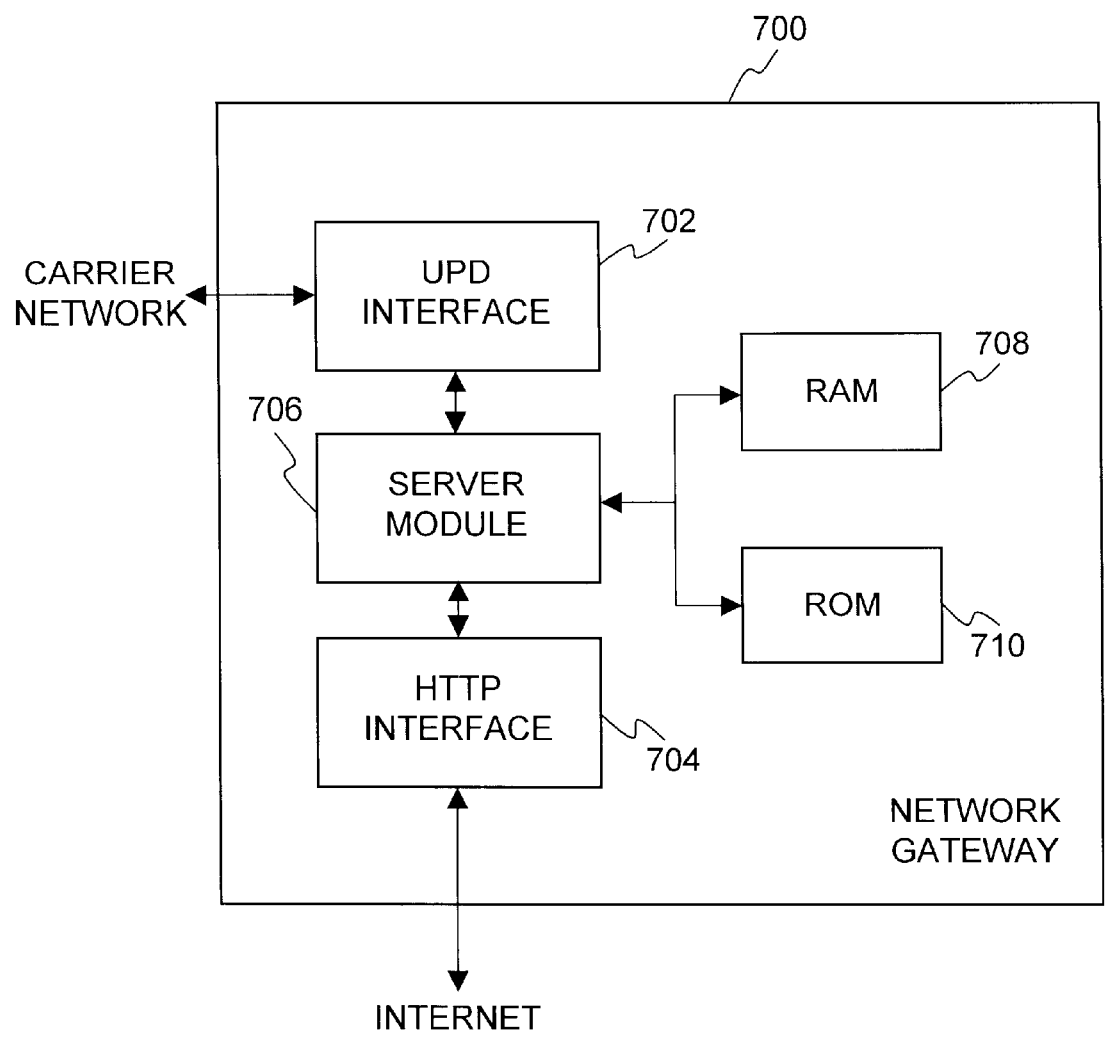
FIG. 7A is a block diagram of a network gateway suitable for use with the representative communication system illustrated in FIG. 6.

FIG. 7A is a block diagram of a network gateway 700 suitable for use with the representative communication system 600 illustrated in FIG. 6. The network gateway 700 can, for example, represent the network gateway 608 illustrated in FIG. 6 which is typically a server computer. To avoid obscuring aspects of the present invention, well known methods, procedures, components, and circuitry in the network gateway 700 are not described in detail.

According to one embodiment, the network gateway 700 includes a User Datagram Protocol (UDP) interface 702 that couples to the carrier network 614, an HTTP interface 704 that couples to the network 606, and a server module 706 coupled between the UDP interface 702 and the HTTP interface 704. The server module 706 performs traditional server processing as well as protocol conversion processing. In particular, the protocol conversion processing includes protocol conversion between UDP and HTTP. It should be understood that UDP interface 702 and HTTP interface 704 are used particularly for respective communication protocols, namely, HTTP in the network 606 and UDP in the carrier network 614, and can be substituted accordingly with other protocol interfaces when the respective communication protocols change. The server module 706 also performs the processing associated with message fragmentation and delivery described above with respect to FIGS. 3A–4. Further, to assist the server module 706 in its processing, the proxy server 700 includes a random access memory (RAM) 708 and a read-only memory (ROM) 710. Among other things, the RAM 708 will store device identifiers, subscriber identifiers, configuration information, access controls tables, and initial local services information. In one embodiment, such information is stored in the RAM 710 as a database. Also, the RAM 710 can represent the account information storage area 610 and the client access control tables illustrated in FIG. 6.

Figure 7B:
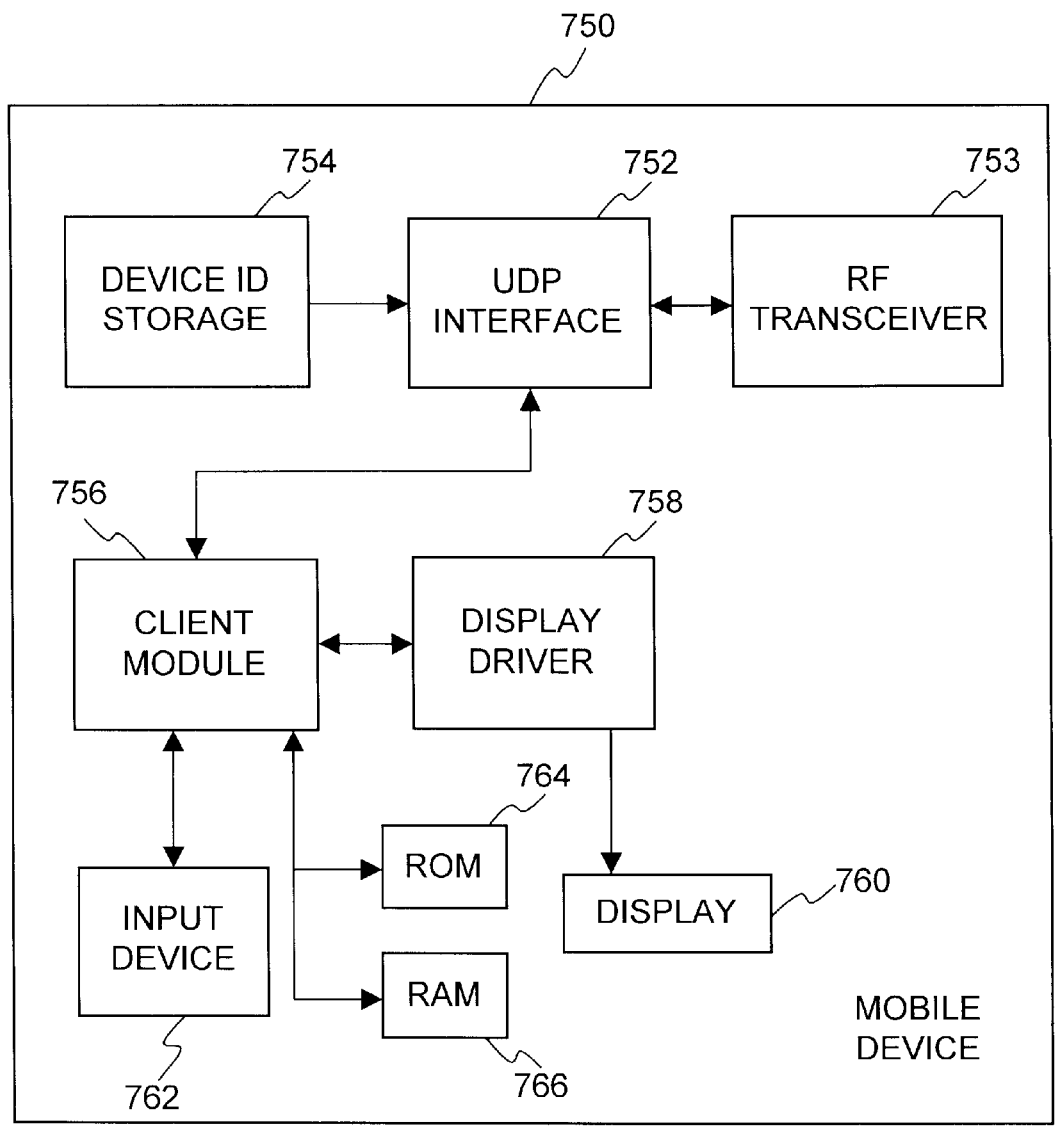
FIG. 7B is a block diagram of mobile device suitable for use with the representative communication system illustrated in FIG. 6.

FIG. 7B is a block diagram of mobile device 750 suitable for use with the representative communication system 600 illustrated in FIG. 6. The mobile device 750 can, for example, correspond to the remote computing device 616 that operates the remote wireless browser 620 illustrated in FIG. 6A.

The mobile device 750 includes a UDP interface 752 that couples to the carrier network 614 via a RF transceiver 753 to receive incoming and outgoing signals. A device identifier (ID) storage 754 supplies a device ID to the UDP interface 752. The device ID identifies a specific code that is associated with a particular mobile device 750. In addition, the mobile device 750 includes a client module 756 that performs many of the processing tasks performed by the mobile device 750 including establishing a communication session with the carrier network 714 and the network gateway 608, requesting and receiving data (e.g., pages) from the network 606, displaying information on a display of the remote computing device, and receiving user input. The client module 756 is coupled to the UDP interface 752 for the establishment of a communication session and the requesting and receiving of data. The client module 756 also performs the processing associated with the reception of the messages transmitted from the gateway computer 608, 700, including the checking for authorization to access local services. The client module 756 controls the display driver 758 to display information on the display 760 to the user. Additionally, the client module 756 is coupled to an input device 762, a ROM 764, and a RAM 766. Preferably, among other things, the client module 756 operates a network browser, such as a Handheld Device Markup Language (HDML) web browser. The input device 762 allows a user of the mobile device 750 to input data and thus make selections in controlling and using the mobile device 750. The ROM 764 stores predetermined data and processing instructions for the client module 756. The RAM 766 is used to provide temporary data storage for incoming and outgoing data being received and transmitted. The RAM 766 is also used to store the access control table (e.g., the access control table 626) and the local service information (parameters).

Although embodiments of the network gateway 700 and the mobile device 750 described in FIGS. 7A and 7B using UDP and HTTP protocols, it should be recognized that other protocols and other protocol stacks can be provided and utilized. Additional details on the design and construction of the network gateway 700 and the mobile device 750 are contained in U.S. patent application Ser. No. 08/570,210 entitled "METHOD AND ARCHITECTURE FOR AN INTERACTIVE TWO-WAY DATA COMMUNICATION NETWORK" by Alain Rossmann, which is hereby incorporated by reference in its entireties.

A representative example of a message authorization according to the invention is provided below. In this example, the service identity is a URL and the network is using HTTP protocol, with the secured connections using HTTPS. This representative will be discussed with reference to FIGS. 2, 3A and 3B.

Initially, a secure connection is established between the mobile device and the network gateway (block 202). Once the connection is established, an access control table is downloaded to the mobile device from the network gateway (block 204). The access control table contains the authorized service identifiers. An exemplary access control table is provided in Table 1 below, in which each entry is a domain name from which the service may be originated.

TABLE 1

Access Control Table uplanet.com
wireless-net.com
phoneconfig.com
.
.
.

Then, once a message for the mobile device is received (block 302), the message is evaluated to determine whether local service access control should be activated (block 304).

For example, in one embodiment a URL scheme of "device:" is used in the message to signify when access to local services is attempted. It is assumed that the message contains the command "device:set registers" which operates to set certain system parameter registers in the mobile device.

Next, the service identity for the message is obtained (block 308). In this example, assume that the origin URL, identifying the originality of the message, for the message is "https://www.uplanet.com/provision_service/set_phone_register" and that the service identity is defined as the domain name contained in the URL. The service identity in this case is the domain name uplanet.com. The service identity (e.g., uplanet.com) for the message is extracted from the URL and then compared with the authorized service identities in the access control table to look for a match (blocks 310 and 312). If a match is found, then the message is authorized to access the local services of the mobile device (block 316); otherwise, the message is denied access (block 314). In this example, the domain name in the origin URL of the message is compared with the entries in the access control table (Table 1). Here, the first entry in the access control table of Table 1 matches the service identity of the message(e.g., uplanet.com). Therefore, in this example, the message is authorized to access the local services of the mobile device.

Additionally, it can be noted that the origin URL for the message in this example began with "https" which indicates that the connection to the remote server is secure. Hence, in the case of FIGS. 4A and 4B, the decision block 416 would be satisfied. If the origin URL for the message in this example had instead began with "http", then the decision block 416 may prevent the message from gaining access to the local services of the mobile device even though the service identity itself would have been authorized. This secure connection requirement prevents messages from being tampered with or counterfeited.

The advantages of the invention are numerous. One advantage of the invention is that local services of mobile devices can be provisioned over the air in a secure fashion. Another advantage of the invention is that access to the local service of a mobile device is able to be protected from hackers or unscrupulous network sites.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for restricting access to local services of a mobile device, said method comprising:
   (a) receiving a message from a computing device through a network, the message having a service identity associated therewith;
   (b) determining whether the message seeks access to the local services of the mobile device;
   (c) comparing the service identity associated with the message against one or more authorized service identities at least when said determining (b) determines that the message seeks access to the local services of the mobile device; and
   (d) permitting the message to access the local services of the mobile device only when said comparing (c) indicates that the service identity associated with the message matches at least one of the one or more of authorized service identities.

2. A method as recited in claim 1, wherein the local services pertain to services provided on the mobile device.

3. A method as recited in claim 1, wherein the message contains executable code.

4. A method as recited in claim 3, wherein said permitting (d) comprises processing the message when the service identity associated with the message matches at least one of the one or more of authorized service identities.

5. A method as recited in claim 3, wherein where said acts of determining (b), comparing (c) and permitting (d) occur as the message is being processed.

6. A method as recited in claim 1, wherein the service identity for the message pertains to the computing device on the network that supplies the message.

7. A method as recited in claim 1, wherein the service identity for the message is a Universal Resource Locator.

8. A method as recited in claim 1, wherein the service identity for the message is one of a string derived from a domain name, a Universal Resource Locator, a network address, an alphanumeric text string and a phone number.

9. A method as recited in claim 1, wherein said determining (d) operates to scan at least a portion of the message to determine whether the message seeks access to the local services of the mobile device.

10. A method as recited in claim 1,
   wherein the message contains executable code that causes the local services to be processed so that system parameters in the mobile device are modified to alter the operation of the mobile device, and
   wherein said permitting (d) comprises executing the message when the service identity associated with the message matches at least one of the one or more of authorized service identities, and
   wherein the stored parameters are altered by the execution of the message.

11. A computer readable medium having computer program code for ensuring secure access to local services of a mobile device, said computer readable medium comprising:
   computer program code for receiving executable code from a computing device through a network, the executable code having a service identity associated therewith;
   computer program code for executing the executable code; and
   computer program code for preventing the executable code from accessing the local services of the mobile device during execution unless the service identity associated with the executable code matches at least one of a plurality of authorized service identities.

12. A computer readable medium as recited in claim 11, wherein said computer readable medium is provided within the mobile device.

13. A computer readable medium as recited in claim 11, wherein the executable code is a compressed markup language file.

14. A computer readable medium as recited in claim 11, wherein the executable code is selected from a group consisting of a markup language file, a script, an applet, an object file, an ASCII file, a binary data file and a scripting language object.

15. A computer readable medium as recited in claim 11, wherein said computer program code for preventing is performed while said computer program code for executing is performed so as to prevent unauthorized access to the local services of the mobile device by any portion of the executable code.

16. A computer readable medium as recited in claim 11, wherein said computer readable medium further comprises:
   computer program code for determining whether the executable code seeks access to the local services of the mobile device; and
   computer program code for comparing the service identity associated with the executable code against one or more authorized service identities at least when said computer program code for determining determines that the executable code seeks access to the local services of the mobile device.

17. A computer readable medium as recited in claim 16, wherein said computer program code for determining and said computer program code for comparing are performed before said computer program code for executing.

18. A computer readable medium as recited in claim 16, wherein said computer program code for determining and said computer program code for comparing are performed during said computer program code for executing.

19. A computer readable medium having computer program code for ensuring secure access to local services of a mobile device, said computer readable medium comprising:
   computer program code for receiving a message from a computer through a network, the message having a service identity associated therewith; and
   computer program code for preventing the message from accessing the local services of the mobile device unless the service identity associated with the message matches at least one of a plurality of authorized service identities.

20. A computer readable medium as recited in claim 19, wherein said computer readable medium further comprises:
   computer program code for preventing the message from accessing the local services of the mobile device when a connection between the mobile device and the computer on the network that supplies the message is determined to be unsecure.

21. A computer readable medium as recited in claim 19, wherein said computer readable medium is provided within the mobile device, and
   wherein the network is the Internet and where the computer is a server computer coupled to the Internet.

22. A computer readable medium as recited in claim 19, wherein the message comprises provisioning information that causes the local services of the mobile device to update system parameters therein so that the mobile device is provisioned with respect to the provisioning information.

23. A computer readable medium as recited in claim 19, wherein said computer readable medium further comprises:
   computer program code for determining whether the message seeks access to the local services of the mobile device; and
   computer program code for comparing the service identity associated with the message against one or more authorized service identities at least when said computer program code for determining determines that the message seeks access to the local services of the mobile device.

24. A mobile device capable of connecting to a network of computers through a wireless link, said mobile device comprising:
   a display screen that displays graphics and text;
   a message buffer that temporarily stores a message from a computer on the network of computers, the message having a service identity associated therewith;
   an application that utilizes the message received from the computer on the network of computers;
   a local services data area that stores local services data which controls operation of said mobile device;
   an authorization storage area that stores authorized service identities that are permitted to access said local services data area;
   an access controller that controls access to said local services data area such that the local services data cannot be altered by said application utilizing the message, unless the service identity associated with the message matches at least one of the authorized service identities.

25. A mobile device as recited in claim 24, wherein said application is a browser application that permits a user to retrieve information from the computers on the network.

26. A mobile device as recited in claim 25, wherein said browser application processes the message.

27. A mobile device as recited in claim 24, wherein said authorization storage area stores an access control table, the access control table includes the authorized service identities that are permitted to access said local services data area.

28. A mobile device as recited in claim 27, wherein when the service identity associated with the message does not match at least one of the authorized service identities stored in the access control table, then said access controller can request verification of the service identity of the message from a third-party verification entity located on the network of computers, and then permits access to said local services data area when the third-party verification entity provides verification such that the local services supported by said mobile device can be altered by said application.

29. A mobile device as recited in claim 28, wherein the access control table further includes a third-party verification identity.

30. A mobile device as recited in claim 27, wherein the service identity associated with the message is added to the authorized service identities stored in the access control table when the third-party verification entity provides verification of the service identity associated with the message which did not previously match at least one of the authorized service identities stored in the access control table.

31. A wireless communication system, comprising:
   a wired network having a plurality of server computers;
   a wireless carrier network operatively connected to said wired network;
   a plurality of wireless mobile devices, each supporting certain local services, the certain local services that are used in determining system parameters that are independently set in each of said wireless mobile devices,
   wherein messages are supplied to said wireless mobile devices from the server computers of said wired network via said wireless carrier network, and
   wherein each of said wireless mobile devices operates, upon receiving one of the messages, to prevent the one of the messages from accessing the system parameters of said each of said wireless mobile devices unless a service identity associated with the one of the messages matches at least one of a plurality of authorized service identities.

32. A system as recited in claim 31, wherein the authorized service entities are stored in said wireless mobile device.

33. A system as recited in claim 31, wherein each of said wireless mobile devices further operates, upon receiving one of the messages, to prevent the one of the messages from accessing the system parameters of said wireless mobile device when a connection between said wireless mobile device and the server computer of said wired network that supplies the one of the messages is determined to be unsecure.

34. A system as recited in claim 31, wherein each of said plurality of wireless mobile devices has an access control table comprising said plurality of authorized service identities.

35. A system as recited in claim 31, wherein said system further comprises:

a proxy server coupled between said wired network and said wireless carrier network, said proxy server responsible for verifying if the one of the messages is from an authorized one of said plurality of server computers.

36. A system as recited in claim 35, wherein each of said plurality of wireless mobile devices has an access control table comprising the plurality of authorized service identities, said access control table being able to be updated by said proxy server when a communication session between said wireless mobile device and said proxy server is secure and authenticated.

* * * * *